United States Patent [19]

Podl

[11] 4,122,720
[45] Oct. 31, 1978

[54] DIESEL ENGINE EXHAUST TEMPERATURE MONITOR

[75] Inventor: William J. Podl, Hanover Park, Ill.

[73] Assignee: Alnor Instrument Company, Niles, Ill.

[21] Appl. No.: 785,505

[22] Filed: Apr. 7, 1977

[51] Int. Cl.² .................... G01K 7/04; F02B 77/08
[52] U.S. Cl. .................................. 73/346; 60/277;
340/57; 364/511
[58] Field of Search .................. 73/341, 346, 117.2,
73/117.3, 343.5; 60/277; 340/57, 227 R;
364/424, 431, 511; 123/198 D, 198 DB

[56] References Cited

U.S. PATENT DOCUMENTS

| 3,101,617 | 8/1963 | Brinson | 73/346 X |
| 3,472,068 | 10/1969 | List et al. | 73/346 X |
| 3,475,750 | 10/1969 | Howell et al. | 340/227 R X |
| 3,574,282 | 4/1971 | Curwen | 73/346 X |
| 3,646,343 | 2/1972 | Cauuer et al. | 73/341 X |
| 3,678,486 | 7/1972 | Bickel et al. | 73/341 X |
| 3,719,071 | 3/1973 | Hohenberg | 73/341 |
| 3,829,849 | 8/1974 | Stauffer | 73/341 X |
| 4,012,906 | 3/1977 | Hattori et al. | 60/277 |
| 4,023,358 | 5/1977 | Mauer et al. | 123/198 D X |
| 4,024,850 | 5/1977 | Peter et al. | 60/277 X |

FOREIGN PATENT DOCUMENTS

| 1,281,173 | 10/1968 | Fed. Rep. of Germany | 73/346 |
| 1,576,416 | 4/1970 | Fed. Rep. of Germany | 73/341 |

Primary Examiner—Richard C. Queisser
Assistant Examiner—Joseph W. Roskos
Attorney, Agent, or Firm—Silverman, Cass & Singer, Ltd.

[57] ABSTRACT

A diesel engine monitor monitors the exhaust gas temperature of each cylinder. A thermocouple is coupled to each cylinder and the monitor scans the analog signal output from each thermocouple which is proportional to the engine exhaust temperature of the cylinder. The analog temperature signal is digitized and stored. A microcomputer controls the operation of the monitor and reads each individual temperature after it has been stored. The microcomputer averages the last temperature stored from each cylinder to form a total moving average for the engine which moves as each engine cylinder exhaust temperature is rescanned. The monitor first checks to see if the temperature signal from a cylinder is due to an open thermocouple. The microcomputer then compares the latest temperature to the previous temperature for that cylinder to determine if it has changed more than 100 degrees. The temperature is then checked against a preset high limit temperature, then 90 percent of the high limit or a prewarn condition, then the low limit, then 110 percent of the low limit or prewarn and then checks the temperature against an allowable deviation from the total moving average of all the cylinders. The monitor eliminates any open thermocouple readings from the cylinder average computation. The monitor has an adjustable setting for the high, low and deviation set points. The monitor will generate an alarm if the temperature fails any of the test except for the 100 degrees difference check.

11 Claims, 5 Drawing Figures

⇒ DATA
→ CONTROL

DIESEL ENGINE EXHAUST TEMPERATURE MONITOR

BACKGROUND OF THE INVENTION

This invention concerns the monitoring of a diesel engine operation, and more particularly a monitor for monitoring the engine exhaust gas temperature for each cylinder in the engine.

To monitor the operation of a diesel or gas engine it is desirable to monitor the exhaust gas temperature of each cylinder. The exhaust gas temperature on a diesel engine will indicate the overloading or underloading of an individual cylinder by causing a high temperature or a low temperature respectively; however, an abnormal operating temperature may also indicate such other faults as inadequate ebgine cooling, excessive friction in the cylinder, partial piston seizures or an inadequate air supply to the cylinder.

It would be useful to compare the exhaust gas temperature of each cylinder with the average of all the other cylinders on the engine so that normal changes in the exhaust gas temperature (EGT) due to a change in load or other factors affecting all the cylinders will not alarm the monitor but a problem with an individual cylinder will cause an alarm.

Furthermore, an accurate monitoring system of the entire engine operation allows the engine to be operated more efficiently and balancing each cylinder to the overall average may result in a fuel savings as well as a more efficient operation of the engine.

Previous analog systems could mechanically scan a set of cylinders; however, they were not as accurate as a digital system. There was no computed average as the analog signals from the other cylinders were placed in parallel and were balanced against the cylinder being tested. Furthermore these previous systems could not account for an open thermocouple which causes an erroneous reading from the system.

SUMMARY OF THE INVENTION

The above and other disadvantages of prior art engine monitors and techniques are overcome in accordance with the present invention by providing a monitor which scans each cylinder thermocouple and converts the analog thermocouple signal to a digital signal proportional to the temperature and compares this signal with various predetermined conditions. The monitor scans the cylinder thermocouples through a multi-channel multiplexer, one cylinder at a time, and converts the analog thermocouple temperature into a digital signal which is then stored. A microcomputer directs the operation of the scanning and computes the engine average cylinder temperature by adding each of the temperatures and dividing by the number of cylinders in the engine. This average is up-dated as each cylinder is scanned and the temperature of each cylinder is compared to the average with a predetermined allowable deviation from the average. The monitor performs a number of checks on each cylinder each time it is scanned. The first check is to ascertain whether the cylinder thermocouple is open, then if it is not the temperature will be digitized and checked against the previous temperature for that cylinder to determine if it has changed more than 100 degrees, then the temperature is checked against a high temperature set point, then a prewarn condition of 90 percent of the high temperature set point, then the low temperature set point, then a prewarn condition of 110 percent of the low temperature setting and then the deviation from the average of all the cylinders is computed. The 100° difference from the previous reading does not cause an alarm but each of the other conditions being exceeded will cause an alarm which can be audio or visual or both. In addition the actual temperature for each cylinder may be displayed along with the cylinder number and the deviation from the average temperature. The multiplexer and analog to digital converter are optically isolated from the digital circuits of the microcomputer to avoid electromagnetic interference.

DESCRIPTION OF THE PREFERRED EMBODIMENT

Figure 1:
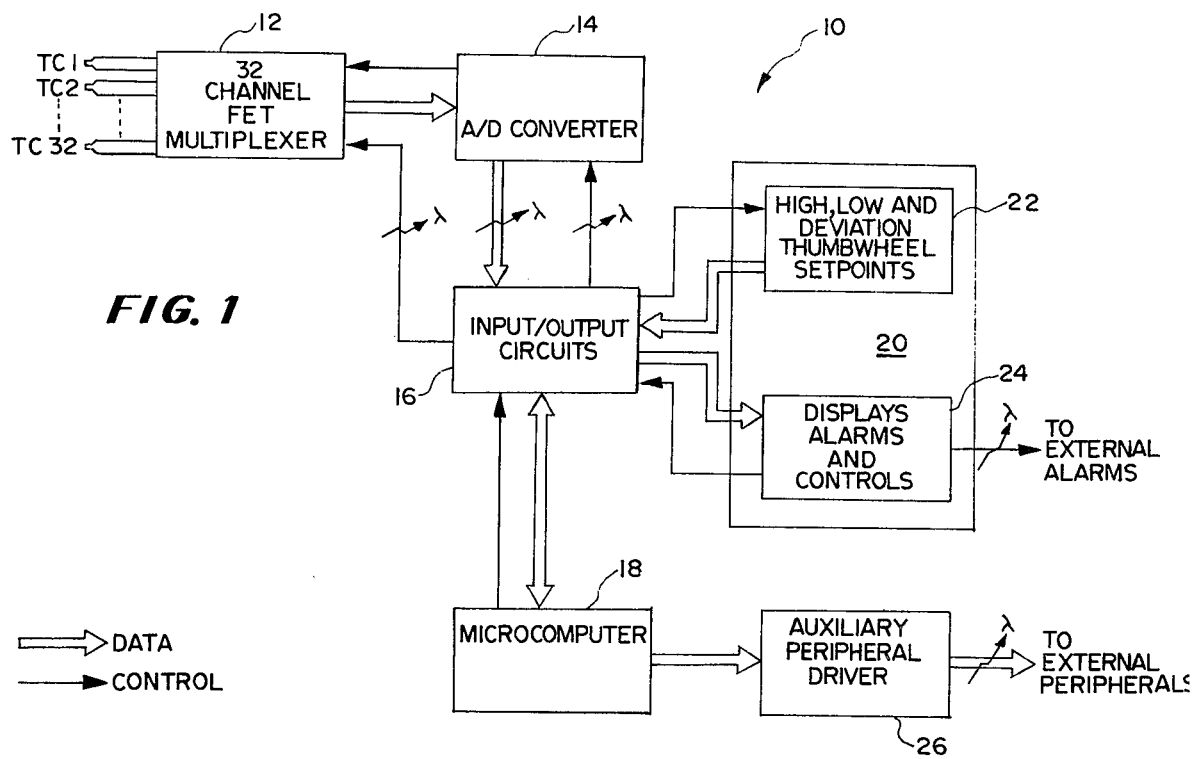
FIG. 1 is a block diagram of the monitor of the invention.

Referring now to FIG. 1, the engine monitor of the invention is designated generally at 10. A 32 channel FET multiplexer 12 is connected to each of 32 thermocouples, TC1-TC32. The multiplexer 12 acts as a switch to switch each thermocouple temperature signal to an analog to digital converter 14. The analog signal which is in the range of a number of millivolts is proportional to the temperature sensed by the thermocouple in the engine cylinder, in this case the exhaust gas temperature (EGT) of the cylinder. The multiplexer and converter are optically isolated from an input output circuit 16 as indicated by the arrows and Greek letter Lambda. The thermocouples, multiplexer and converter are optically isolated from the rest of the circuitry to substantially eliminate the electromagnetic interference with the digital processing circuitry. This electromagnetic interference often arises in pumping stations, ship engines, compressor insulations and generator set ups in which the monitor may be installed.

As indicated by the single and dual lines, the control and data information respectively, are routed through the input output circuit 16. The control of the monitor is a microcomputer 18. The microcomputer 18 is advantageous because of its size and cost; however, the same functions could be provided with a hard wired type of control or a general purpose computer. A display and control block 20 is also connected to the input output circuit 16 and includes the adjustable set point controls 22 and the displays, alarms and controls 24. The displays and alarms 24 has an optically isolated output which may be connected to an external alarm, audio and/or visual, as desired. The data from the microcomputer also may drive an auxiliary peripheral driver 26 which would be optically isolated from external peripheral equipment, such as a remote printer or a remote display.

The operation of the monitor 10 is as follows. Under control of the microcomputer 18 the multiplexer 12 will switch one of the millivolt outputs from one of the thermocouples TC-1 indicative of that cylinder's EGT to the analog digital converter 14. The analog to digital converter 14 accepts the analog millivolt output from the multiplexer 12 and then converts the analog data to a digital pulse train indicative of the temperature. The analog to digital converter 14 may be any type of thermocouple analog to digital converter, such as the digital temperature indicator models No. 6710, 6730 or 6740 sold by Alnor Instrument Company. The voltage generated by a thermocouple is a nonlinear function of temperature, but the analog to digital converter 14 preferably will compensate for the nonlinearity over the full temperature range of the thermocouple. The converter 14 also should compensate for cold-end temperature (reference-junction temperature).

The converter 14 performs an open circuit thermocouple check before converting the analog signal to the digital signal. A current limiting resistor is placed in the input of the converter with one end connected to a negative voltage divider with a voltage of approximately minus 1 to 1½ volts and the other end is coupled to one lead of the thermocouple. A current will flow through the resistor and through an operating thermocouple and will not cause an alarm; however, if the thermocouple is open no current will flow through the resistor and the negative one to one and one-half volts will be coupled to the converter to indicate an open thermocouple. A normal thermocouple millivolt output will be converted by the converter 14 to a digital output and will be stored in the input output circuit 16.

The input output circuit 16 stores the digital temperature signal until it is read by the microcomputer 18. The high, low and deviation from average set points are set in the block 22. The input output circuit 16 will read each digit under the microcomputer control and receive the data from that set point each time a cylinder is scanned. The microcomputer 18 synchronizes the entire operation and performs the numerical computations on the digital temperature data which is received in BCD form from the converter 14. The microcomputer stores the temperature data from each cylinder and computes the average of the cylinders each time the temperature is up-dated for each cylinder. Following each calculation the microcomputer 18 will output the data through the input output circuit 16 to the displays and alarms block 24 to display the temperature and to indicate an alarm if one of the preset conditions has not been met. The microcomputer 18 may also output the data to the auxiliary peripheral driver 26 to drive the remote peripherals.

Figure 2:
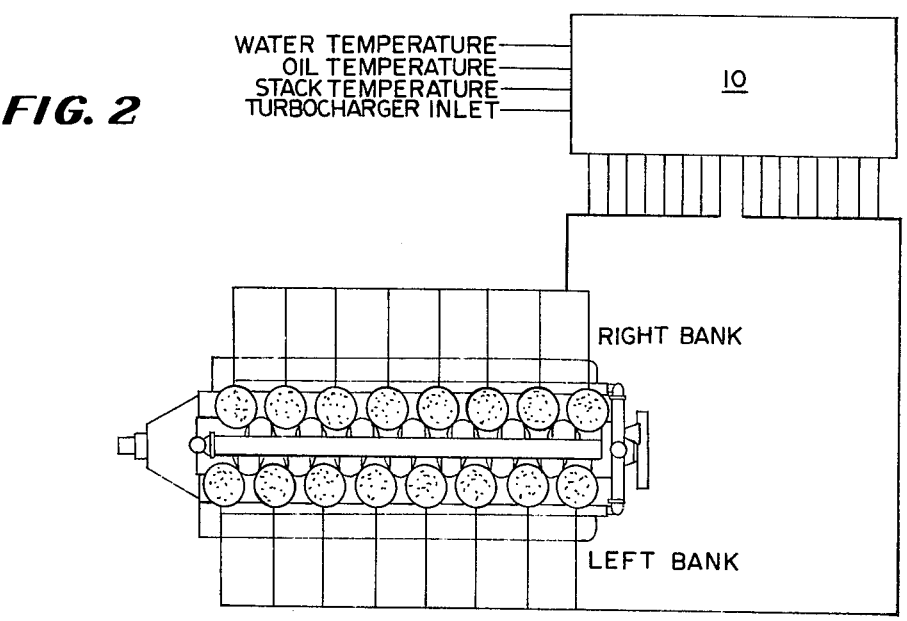
FIG. 2 is a block diagram of the monitor illustrating a single engine application.

Referring now to FIG. 2 a single engine monitoring application is illustrated with a 16 cylinder engine. The monitor 10 will monitor each of the 16 cylinders and in addition may monitor 16 extra zones such as the water temperature, oil temperature, stack temperature or turbocharger inlet. These extra zones are not included in the cylinder EGT averages but are otherwise operated on in a like manner as the EGTs. The monitor 10 has been shown with 32 thermocouples; however, there could be more or less as desired.

Figure 3:
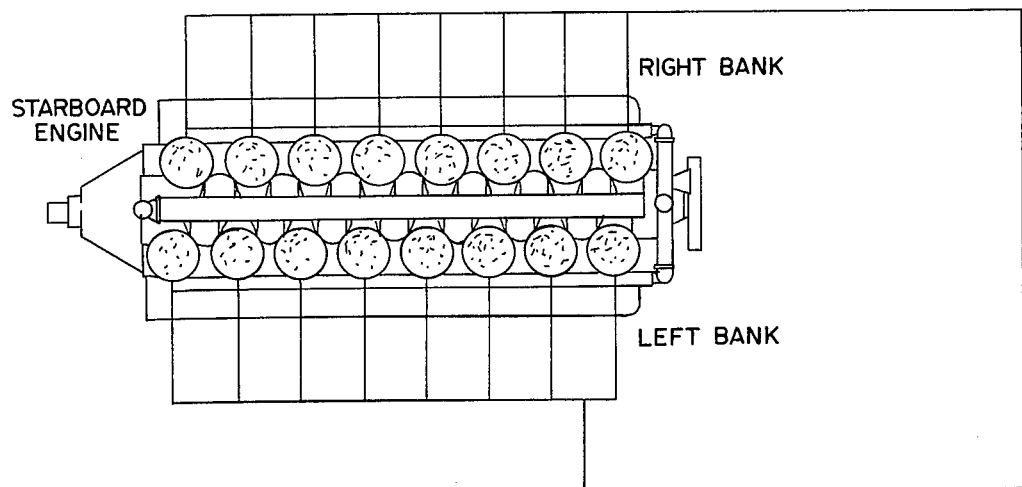
FIG. 3 is a block diagram similar to FIG. 2 illustrating a dual engine application.
Figure 3:
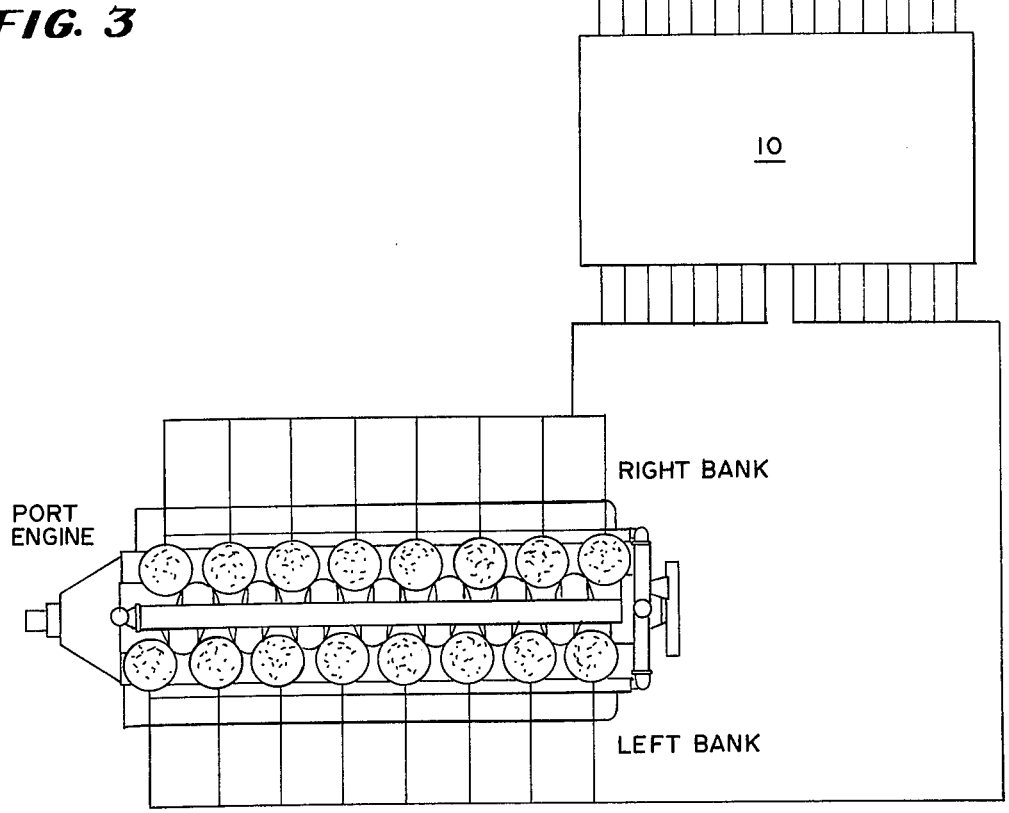

Referring to FIG. 3 a dual engine application is illustrated monitoring a starboard and a port engine each having 16 cylinders for a total of 32 cylinders. The monitor 10 may be set to monitor both engines or only the port or starboard engine. In this application both the port and starboard engines would have to have common alarm set points; however, in most applications such as marine applications both of the engines are normally used at the same power levels so the common set point requirement is not a problem. The monitor will scan all the cylinders of one engine and then all the cylinders of the other and will keep separate engine averages.

Figure 4:
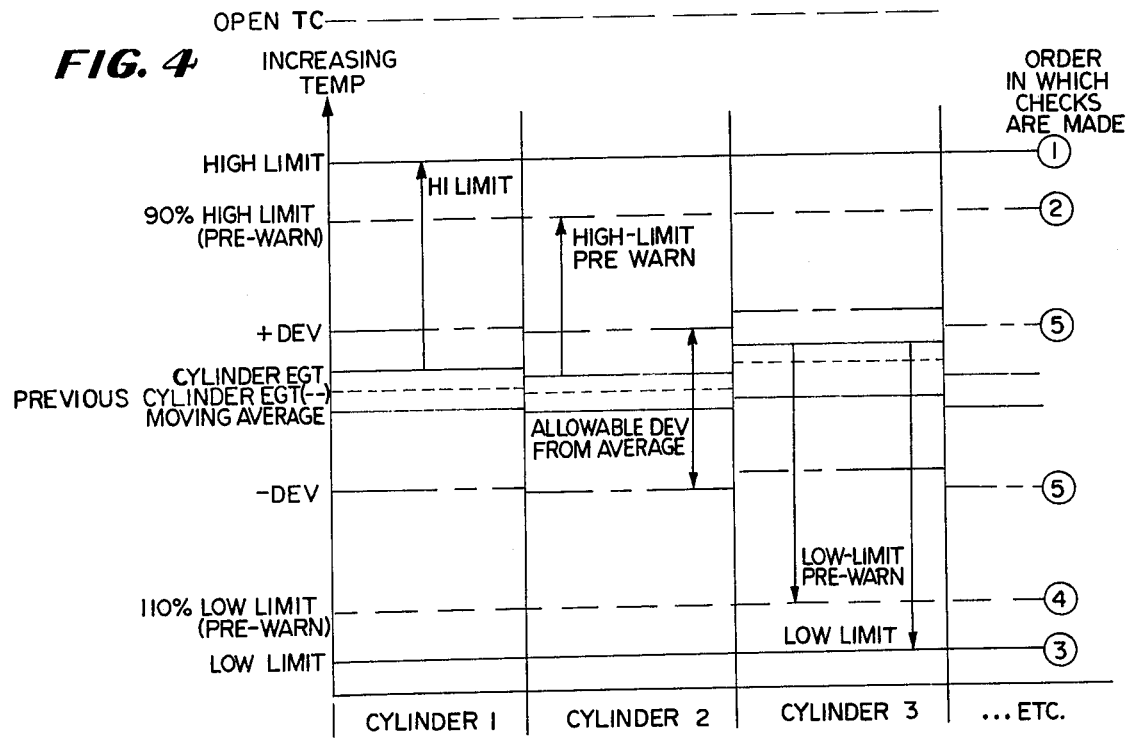
FIG. 4 is a chart illustrating the alarm hierarchy of each engine cylinder.

FIG. 4 illustrates the alarm hierarchy chosen for convenience to indicate the most serious conditions first. The microcomputer 18 is set for a predetermined sequence of operations; however, the sequence could be done in a different order if desired. The microcomputer 18 first checks for an open thermocouple. An open thermocouple would allow an excessive engine temperature to go undetected. The microcomputer then checks the temperature on this scan against the temperature stored from that cylinder on the previous scan to see if the temperature has changed by greater than 100 degrees. This is a noise checking condition and if the difference between the previous temperature and the current temperature is greater than 100 degrees the temperature will be redigitized.

The microcomputer then compares the temperature read with the predetermined high limit, then the prewarn limit of 90 percent of the high limit. Then the monitor checks the temperature against the low limit and then the prewarn low limit of 110 percent of the low limit. And finally the monitor checks the cylinder EGT with the allowable deviation from the average of all the cylinder EGTs. The monitor then will up-date the overall engine cylinder EGT average and then scan the next cylinder and repeat the tests. The monitor will eliminate any cylinder with an open thermocouple from the overall EGT average.

The monitor redigitizes the data any time a limit is exceeded, in this manner each alarm is double checked. An alarm may be indicated following a first valid condition failure; however, an alarm condition typically is not indicated until the alarm has existed for a number of consecutive scans such as three. This alarm delay is utilized because an engine may appear to malfunction even though it is operating normally. Tugboat operations, for example, often "gun" their boat engines, generating rapid but nonetheless normal cylinder temperature changes. To avoid the monitor alarming on these temporary temperature changes the monitor will wait three scan periods before sounding any alarm. For example with a 1 second per cylinder scan time and a 12 cylinder engine this would be a delay time of 36 seconds which would allow the cylinder EGTs to stabilize.

Figure 5:
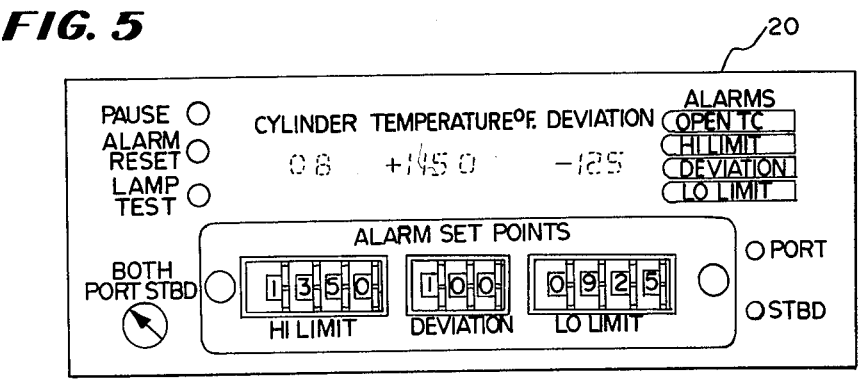
FIG. 5 is an example of a display block of the monitor.

FIG. 5 illustrates one embodiment of the display and control 20. A push button is provided for a pause, alarm reset and lamp test function. The pause button allows the operator to continuously monitor one cylinder, the alarm reset is utilized to reset the alarms and the lamp test button is utilized to check the displays. The operation of the lamp test button will display all eights on the display to test all of the light emitting diodes (LEDs) of the display. The alarm set points are set by the operator with a thumb wheel switch for each digit. In this example, the high limit has been set at 1350°, the deviation from average limit as 100° and the low limit at 925°. In the example, cylinder 8 is displaying an EGT reading of 1150° with a deviation of minus 125° from the overall cylinder EGT average. The temperature of 1150° is between the high and low limit and will not cause this to alarm; however, this is greater than the 100° deviation set and therefore the alarm LED for the deviation will be lit. The alarms may be audio or visual, as indicated, and be LED or other light emitting displays. The four visual displays signal an open thermocouple, the high limit exceeded, the deviation from the EGT average exceeded or the low limit exceeded. The prewarn condition for the high limit and low limit will cause the high limit or low limit LED to flash and a temperature beyond the high or low limit will cause this lamp to light constantly. The operator also may set the port or starboard switch for a dual engine operation or he may set it so the monitor will continuously monitor both engines. The monitor has two lamps which will indicate which of the two engines port or starboard is being monitored.

An extra monitored zone only would display the number of the zone and the temperature. An open thermocouple is indicated by all nine's in the temperature and deviation display. The deviation from the average is utilized in balancing the operation of the engine for efficiency and to conserve fuel. In one actual operation, on a small six cylinder Nordberg engine, a fuel economy and savings of two percent was made which equated to a dollar savings of $2800 per year.

The monitor utilizing the digital temperature data is more accurate than the analog systems previously used and the average EGT of the engine is an absolute computation rather than the previous analog weighted parallel system. In this embodiment the microprocessor is a 4040 microprocessor sold by Intel.

Many modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. A monitoring system for monitoring the operation of a diesel engine, said engine including a plurality of cylinders, each cylinder having a cylinder exhaust through which the cylinder gases are exhausted, comprising:
    a plurality of thermocouples one coupled to each cylinder exhaust to develop an analog signal proportional to the engine exhaust gas temperature of each cylinder;
    means for converting said analog signal to a digital signal representative of said temperature and including means for checking for an open thermocouple;
    switching means for coupling each of said thermocouple analog signals to said converting means one at a time; and
    control means coupled to said converting means including means for storing each digital signal from each cylinder, means for numerically taking the average of the total of the latest stored digital signal from each cylinder and excluding any signal from an open thermocouple, and means for comparing each digital signal with said average and for determining if each signal is within a predetermined amount above and below said average.

2. A monitoring system as claimed in claim 1 wherein said control means include:
    means for determining whether each digital signal is within a predetermined number of degrees of the previous digital signal from said cylinder.

3. A monitoring system as claimed in claim 1 wherein said control means include:
    means for comparing each cylinder signal with a predetermined high limit; and
    means for comparing each digital signal with a prewarn limit of a predetermined percentage less than said high limit.

4. A monitoring system as claimed in claim 1 wherein said control means include:
    means for comparing each digital signal with a predetermined low limit; and
    means for comparing said digital signal with a prewarn limit of a predetermined percentage greater than said low limit.

5. A monitoring system as claimed in claim 1 wherein said control means include:
    means for redigitizing each analog signal when the digital signal is determined to exceed said predetermined deviation amount above and below said average.

6. A monitoring system as claimed in claim 1 further including:
    display means for displaying said digital signal, the amount said signal deviates from said average, and the number of the cylinder being scanned; and
    set point controls for setting the predetermined amount of deviation of said digital signal.

7. A monitoring system as claimed in claim 1 further including:
    alarm means for indicating an alarm when said digital signal exceeds said predetermined deviation amount; and
    including means for interrupting said switching means to continuously scan a single cylinder; and
    means for resetting said alarm.

8. A monitoring system as claimed in claim 1 wherein said control means include:
    means for determining whether each digital signal is within a predetermined number of degrees of the previous digital signal from said cylinder;
    means for comparing each cylinder signal with a predetermined high limit;
    means for comparing each digital signal with a prewarn limit of a predetermined percentage less than said high limit;
    means for comparing each digital signal with a predetermined low limit; and
    means for comparing said digital signal with a prewarn limit of a predetermined percentage greater than said low limit.

9. A monitoring system as claimed in claim 8 wherein said control means include:
    means for redigitizing each analog signal when the digital signal is determined to exceed any one of said predetermined deviation amount above and below said average, said high limit, said prewarn high limit, said low limit, said prewarn low limit and said predetermined number of degrees greater than the previous cylinder signal.

10. A monitoring system as claimed in claim 8 further including:
    display means for displaying said digital signal, the amount said signal deviates from said average, and the number of the cylinder being scanned; and
    set point controls for setting the predetermined amount of deviation of said digital signal, the high limit and the low limit.

11. A monitoring system as claimed in claim 8 further including:
    alarm means for indicating an alarm when said digital signal exceeds said predetermined deviation amount, said high limit, said prewarn high limit, said low limit, or said prewarn low limit; and
    including means for interrupting said switching means to continuously scan a single cylinder; and
    means for resetting any of said alarms.

* * * * *